Aug. 8, 1950        C. L. WILLIS        2,518,410
ATTACHMENT FOR CARRYING A TRAILER ON A TRUCK
Filed May 18, 1948
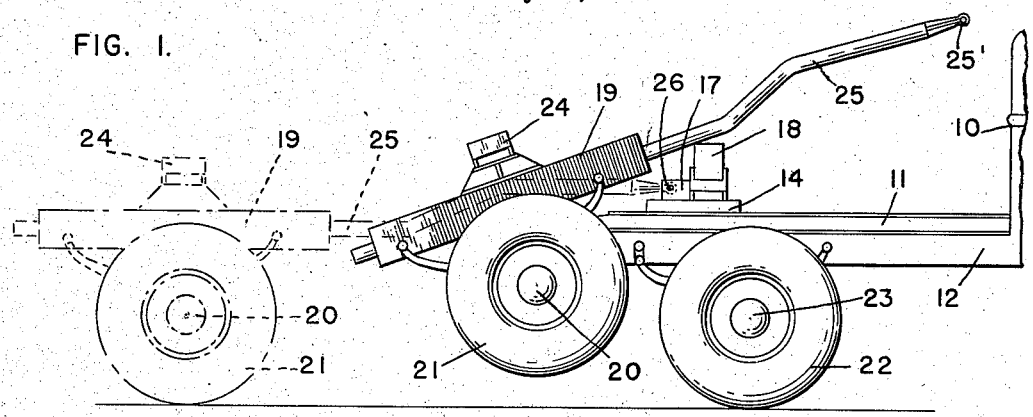
FIG. 1.
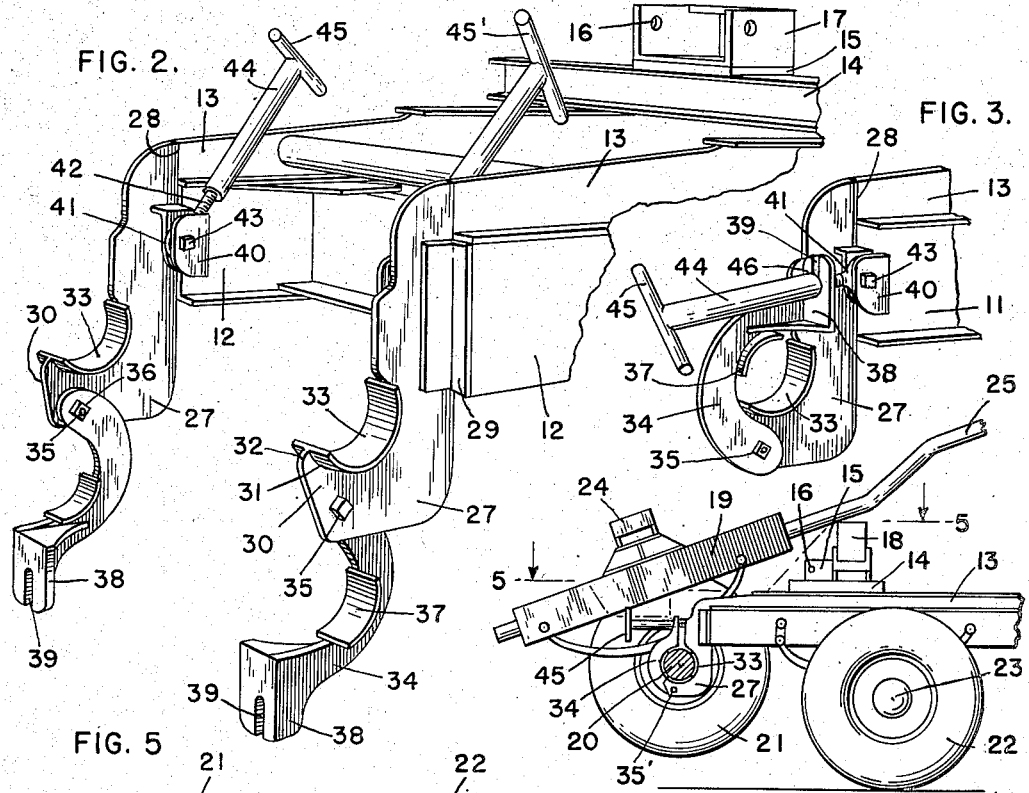
FIG. 2.
FIG. 3.
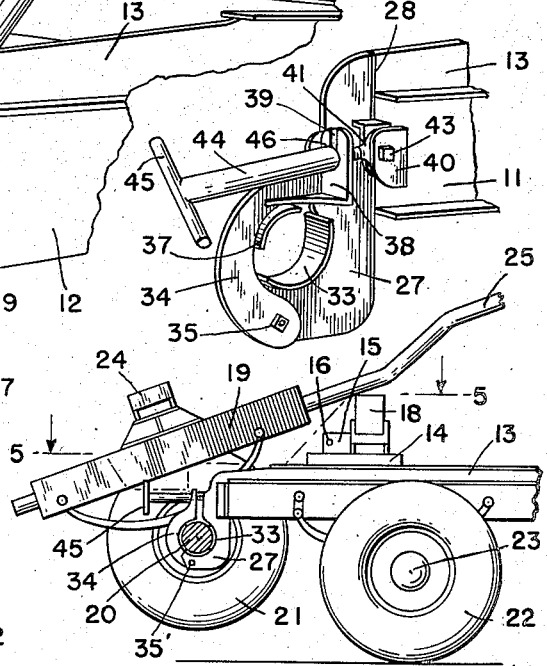
FIG. 4.
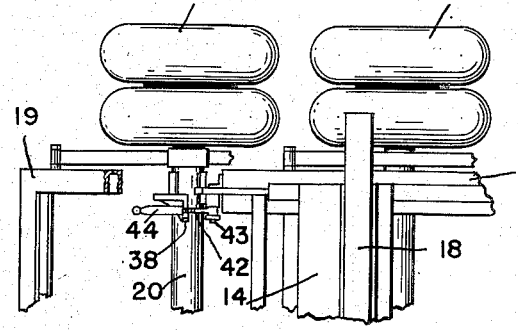
FIG. 5
Inventor
CLARENCE L. WILLIS
By *Cushman Darby Cushman*
Attorneys Patented Aug. 8, 1950

2,518,410

UNITED STATES PATENT OFFICE 2,518,410

ATTACHMENT FOR CARRYING A TRAILER ON A TRUCK

Clarence L. Willis, Mobile, Ala., assignor to Gulf Lumber Company, Inc., Mobile, Ala., a corporation of Alabama Application May 18, 1948, Serial No. 27,696

1 Claim. (Cl. 280—33.02)

This invention relates to trailers, and more particularly, to improved means for carrying a trailer on a truck or the like.

An important object of the invention consists in connecting to the rear end of a logging truck, spaced clamping means for supporting the axle of an empty trailer, so that the latter may be firmly and securely carried by the truck on the return trip after unloading the logs or lumber.

A further object is to provide a cradle attachment or assembly on the truck, which is simple, efficient, safe and positive in operation. The attachment includes a pair of depending members or brackets secured to the rear end of the truck and provided with outwardly extending parallel arms, the upper faces or sides of said arms being formed with transversely aligned bearing surfaces for receiving and supporting the axle of the trailer to be carried by the truck. Connected to the arms of the depending members are pivoted clamping members having curved bearing surfaces which coact with the bearing surfaces on said arms to engage and firmly maintain the axle of the trailer in a fixed position. Manually operable means are movably carried by the truck and are arranged to releasably engage the clamping members when the latter are moved to their closed or operative position so as to insure the axle of the trailer being locked in position when the trailer is being carried or hauled by the truck.

Other objects and advantages of the invention will become apparent from the following description when taken in conjunction with the accompanying claim and drawings.

Referring to the drawings in which is shown a preferred embodiment the invention may assume:

Figure 1 is a side view of a logging truck showing in full lines the trailer carried by the rear end of the truck by the improved clamping cradle means, and in dotted lines shows the trailer connected to the truck in its log carrying position.

Figure 2 is an enlarged perspective view of the rear end of the logging truck showing the cradle assembly connected thereto and with the clamping members in their open position.

Figure 3 is a detail view of one of the clamping cradle members showing the parts in their closed or locked position.

Figure 4 is a longitudinal sectional view of the rear end of the logging truck showing the trailer being carried by the truck and secured in position by the clamping cradle means, and Figure 5 is a sectional view taken substantially along the line 5—5 of Figure 4.

Referring to the drawings in which like numerals indicate like parts in the several views, 10 designates a conventional logging truck provided with the usual chassis frame 11 having spaced longitudinally extending side channel members 12. Mounted on the top of the side members 12 and suitably secured thereto, such as by welding or the like, are upwardly extending I-beams or members 13 preferably coextensive in length with the members 12. A bolster or flat plate 14 extends transversely of the chassis frame 11 and is mounted in a fixed position on the I-beams 13. Fixed centrally to the bolster 14 is a U-shaped member or clevis 15 having aligned openings 16 in the sides 17 thereof. Mounted on the bolster 14 and in front of the member 15 is a bunk or steel beam 18.

A log trailer 19 is arranged to be towed by the truck 10 for transporting the logs or lumber, and is preferably provided with a single axle 20 on which is rotatably mounted four wheels 21 that correspond in number to the number of rear wheels 22 on the rear axle 23 of the truck 10. A transverse bunk 24 is carried by the trailer and is the same distance from the ground as the bunk 18 on the truck so as to provide a support for carrying the load of lumber. The trailer 19 has a reach pole or tongue 25, the outer end of which is provided with a transverse opening 25' arranged to register with the openings 16 in the member 15 and be detachably secured thereto by a retaining pin 26 when the trailer is towed by the truck.

In order to save unnecessary wear on the tires 21 of the trailer after the load has been discharged, and also to eliminate the danger of the empty trailer turning over, which not infrequently occurs when towed by the truck due to the sudden application of the brakes, the rear end of the truck has connected thereto a cradle assembly for receiving and entirely supporting the empty trailer on the return trip after the logs have been unloaded or discharged. This cradle assembly preferably includes a pair of spaced depending members 27 which are welded or otherwise connected to the rear ends of the side members 12 and beams 13 as at 28 and may be reinforced by the angle bars 29, welded or otherwise secured to the members 27 and the ends of the side members 12 (Fig. 2). Each of the depending members 27 has extending outwardly therefrom, a supporting arm 30 having an upper curved face or side 31 to which is welded as at 32 a curved bearing plate or member 33 in transverse alignment with the complementary bearing member on the other member 27. Each of the bearing members 33 is of such a size as to receive and support the axle 20 of the trailer 19 when the empty trailer is carried by the truck. Associated with the depending members 27 are curved clamping members 34 which are movably connected at their inner ends to the arms 30 by the threaded bolts 35 and the nuts 36. Welded or otherwise secured to the clamping members 34 are curved bearing plates 37, which when the axle of the trailer is mounted in the bearing plates 33 on the members 27, are arranged to be moved from their open position, as shown in Figure 2, to their closed or clamping position as shown in Figure 3, so as to overlap the trailer axle 20 and coact with the bearing members 33 to securely maintain the axle in a fixed position on the truck (Fig. 4). The outer free ends of the clamping members 34 are formed with laterally projecting lugs or flanges 38 having slots 39 which assume a vertical position (Fig. 3) when each of the clamping members 34 is swung upwardly so as to overlap the trailer axle carried by the cradle members 27. Fixed U-shaped brackets 40 are welded or otherwise suitably secured to the inner faces of the side members 12 and receive the looped ends 41 of threaded rods 42 so as to be pivotally secured thereto by the bolts 43. Interiorly threaded sleeves 44 are connected to the rods 42 and are provided at their outer ends with operating handles 45 so as to be axially movable or adjustable on the rods 42. When the parts are in their inoperative position, the rods 42 and sleeves 44 may be swung forwardly to assume the position as shown in Figure 2, and when the clamping members 34 are swung upwardly to their closed position (Fig. 3), the rods 42 and sleeves 44 may be moved rearwardly to a substantially horizontal position, so that each rod will extend through a slot 39 that is now in its vertical position, and be firmly clamped thereto by manually turning the sleeve 44 so that the inner end thereof will be brought into tight frictional engagement as at 46, with the adjacent side of the lug 38.

In operation, assuming that the logs have been unloaded from the combination truck and trailer assembly, before releasing the trailer 19 from the truck, the hinged clamping members 34 are released from locking engagement with the sleeves 44 so that they will swing downwardly and assume the position as shown in Figure 2. The driver then backs the trailer 19 up on spaced blocks or ramps, not shown, so as to raise the wheels of the trailer about 12 inches off the ground. The trailer is then uncoupled from the truck by removing the retaining pin 26 and the reach pole 25 elevated. The truck is then backed up to the trailer axle 20 so that the axle is positioned directly above and close to the bearing plates 33 on the cradle members 27. The hinged clamping members 34 are now raised to their closed position (Fig. 4), so that the bearing plates 37 will overlap and engage the trailer axle 20 at the same time the slots 39 are moved to their vertical position to receive the threaded rods 42 which are swung downwardly so that upon rotating the sleeve 44, the inner end of the latter will be brought into firm locking engagement as at 46 with the lugs 38 adjacent the slots 39 to maintain the clamping members 34 in a fixed or locked position relative to the trailer axle 20.

When the truck reaches its loading destination, the trailer is again wheeled up on a set of blocks or ramps, not shown, and the sleeves or hand screws 44 are loosened so that the hinged clamping members 34 may drop to their open position. A chock, not shown, may then be placed under the wheels 21 of the trailer and the truck moved forward until the opening 25' in the reach pole 25, registers with the openings 16 in the clevis plate 15 so that the reach may be connected to the truck by the insertion of the retaining pin 26 through the now aligned openings 16 and 25'. The combination truck and trailer is now ready to be reloaded with lumber and transported to the point of discharge.

It will be seen that the cradle assembly provides simple, efficient, safe and positive means for supporting and carrying the empty trailer 19, after the load has been discharged, so that the return or re-loading trip may be made in safety and without unnecessary wear on the trailer tires 21, and that the reach pole 25 in its inclined position firmly rests on the bunk 18 of the truck. While the threaded rods 42 and their associated parts are shown secured to the inside of the chassis frame, it will be manifest that these parts may be connected to the outside of the chassis frame 11. Moreover, the clamping cradle assembly while shown associated with a single axle trailer, may be with equal efficiency used with a double axle trailer to haul the same.

It will be understood that the form of the invention shown and described is merely illustrative of a preferred embodiment and that such changes may be made as fall within the purview of one skilled in the art without departing from the scope of the following claim.

I claim:

In combination with a logging truck, a trailer arranged to be carried by said truck, said truck having at its rear end transversely spaced depending cradle members provided with outwardly extending parallel arms, said arms having aligned curved bearing surfaces for receiving and supporting the axle of the trailer, a clamping member pivotally connected at one end to an arm of the cradle member, the opposite end of the clamping member having a slot arranged to assume a vertical position when the clamping member is moved to engage the axle of the trailer, threaded rods pivotally connected at one end to said truck adjacent the cradle members, each of said rods being arranged to extend through a slot in a clamping member when the slot is moved to its vertical position, and a manually operable sleeve threaded to said rod and arranged to engage the clamping member to releasably maintain the same in overlapping engagement with the axle of the trailer when the latter is carried by the truck.

CLARENCE L. WILLIS.

REFERENCES CITED

The following references are of record in the file of this patent:

UNITED STATES PATENTS

| Number | Name | Date |
|---|---|---|
| 2,038,156 | Alexander | Apr. 21, 1936 |
| 2,038,863 | Thompson | Apr. 28, 1936 |
| 2,176,326 | Brown et al. | Oct. 17, 1939 |
| 2,282,137 | Keehn | May 5, 1942 |